(12) United States Patent
Zhang et al.

(10) Patent No.: US 8,275,033 B2
(45) Date of Patent: Sep. 25, 2012

(54) PICTURE MODE SELECTION FOR VIDEO TRANSCODING

(75) Inventors: Ximin Zhang, San Jose, CA (US); Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1196 days.

(21) Appl. No.: 12/009,054

(22) Filed: Jan. 15, 2008

(65) Prior Publication Data

US 2009/0180532 A1 Jul. 16, 2009

(51) Int. Cl.
*H04N 7/12* (2006.01)
*H04N 11/02* (2006.01)
*H04N 11/04* (2006.01)
*G06K 9/46* (2006.01)

(52) U.S. Cl. ............. 375/240.1; 375/240.16; 348/448; 382/243

(58) Field of Classification Search .......... 375/240.16, 375/240.21; 348/320–389, 448–458; 382/232–286
See application file for complete search history.

(56) References Cited

U.S. PATENT DOCUMENTS

| | | | | |
|---|---|---|---|---|
| 5,610,659 A * | 3/1997 | Maturi et al. | ............ | 375/240.24 |
| 6,256,345 B1 * | 7/2001 | Cho | ............ | 375/240.08 |
| 6,307,976 B1 * | 10/2001 | Chun et al. | ............ | 382/243 |
| 6,327,306 B1 * | 12/2001 | Sugiyama | ............ | 375/240.21 |
| 6,421,385 B1 | 7/2002 | Uenoyama et al. | | |
| 6,574,276 B2 | 6/2003 | Cougnard et al. | | |
| 6,577,767 B2 | 6/2003 | Lee | | |
| 7,142,601 B2 * | 11/2006 | Kong et al. | ............ | 375/240.16 |
| 7,242,436 B2 * | 7/2007 | Tsao et al. | ............ | 348/448 |
| 2006/0222251 A1 | 10/2006 | Zhang | | |
| 2007/0030904 A1 * | 2/2007 | Winger et al. | ............ | 375/240.16 |
| 2007/0030906 A1 * | 2/2007 | Cote et al. | ............ | 375/240.16 |
| 2007/0274389 A1 * | 11/2007 | Kim et al. | ............ | 375/240.16 |

OTHER PUBLICATIONS

Guerrero, M., et al., "Fast Macroblock-Adaptive Frame/Field Docing Selection in H.264", http://scien.stanford.edu/2005projects/ee398/projects/reports/Guerrero%20Chan%20OTsang%20-%20Project-%20Report%20-%20Fast%20Macroblock%20Adaptive%20-Coding%20H264.pdf, 2005, pp. 1-6.

Zhang, et al., "Adaptive Field/Frame Selection for High Compression Coding", Department of ECE, New Jersey Institute of Technology, Newark, NJ, http://www.merl.com/reports/docs/TR2003-29.pdf, 2003, pp. 1-11.

Yu, et al., "Fast Frame/Field Coding for H.264/AVC", http://ieeexplore.ieee.org/iel5/11153/35811/01698465.pdf?tp=&arnumber1698465&isnumber=35811 2006, pp. 1-4.

* cited by examiner

*Primary Examiner* — Man Phan
(74) *Attorney, Agent, or Firm* — Blakely, Sokoloff, Taylor & Zafman LLP

(57) ABSTRACT

An adaptive picture mode selection transcoder selects an encoding mode in a second format for frames of video previously encoded in a first format by determining a magnitude of interlacing phenomenon in the using picture information obtained during decoding of the video from the first format. In one aspect, the picture information includes discrete cosine coefficients for macroblocks in the frame. In another aspect, the picture information includes an encoding mode for the macroblocks in the first format. In yet another aspect, the picture information includes motion vector information for the macroblocks. In still another aspect, the determining is specific to an encoding mode for the frame.

16 Claims, 8 Drawing Sheets

PICTURE MODE SELECTION FOR VIDEO TRANSCODING

FIELD OF THE INVENTION

This invention relates generally to transcoding between video formats, and more particularly to selecting a picture mode when transcoding.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright © 2006, Sony Electronics Inc., All Rights Reserved.

BACKGROUND OF THE INVENTION

As one of the most successful industry standard, MPEG-2 has been widely used in digital video and entertainment applications for over 10 years. As the result, the majority of video contents, such as DVD and digital broadcasts, are encoded in MPEG-2. However, the newer H.264/AVC video standard typically improves coding efficiency by a factor of two over MPEG-2. When AVC is used to compress video sequences, a user can store more contents in the same storage amount and enjoy high quality video streaming with smaller bandwidth. Thus, it is desirable to transform an MPEG-2 bit stream to an H.264/AVC video bit stream. The most straightforward approach for such transcoding is to decode an MPEG-2 bit stream into raw data (YUV) and use an AVC encoder to compress the raw data. However, this approach does not utilize any additional picture information obtained during the MPEG-2 decoding processes.

In addition, the resulting bit stream may not be optimal in terms of picture quality. In the AVC standard, coding mode selection plays an important role in improving the compression efficiency and quality. For example, the AVC standard allows adaptive picture mode selection when encoding an interlaced video sequence so a frame can be coded as a single frame using frame coding, or a frame can be divided into two fields and coded as two individual fields using field coding. Using a properly selected picture mode during transcoding has been shown to result in a 2 db improvement over either frame only coding or field only coding. However, the prior art transcoding methods use an exhaustive search-based two pass scheme. Each frame is first encoded by frame mode, and the corresponding bit rate and distortion are recorded. The same frame is then encoded by field mode, and the corresponding bit rate and distortion are recorded. A cost function is used to compare the two coding modes, including their corresponding bit rates and distortions. The mode with smaller cost is selected. Although good performance can be obtained using the two pass scheme, its complexity renders its use in real life applications prohibitive.

SUMMARY OF THE INVENTION

An adaptive picture mode selection transcoder selects an encoding mode in a second format for frames of video previously encoded in a first format by determining a magnitude of interlacing phenomenon in the using picture information obtained during decoding of the video from the first format. In one aspect, the picture information includes discrete cosine coefficients for macroblocks in the frame. In another aspect, the picture information includes an encoding mode for the macroblocks in the first format. In yet another aspect, the picture information includes motion vector information for the macroblocks. In still another aspect, the determining is specific to an encoding mode for the frame.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
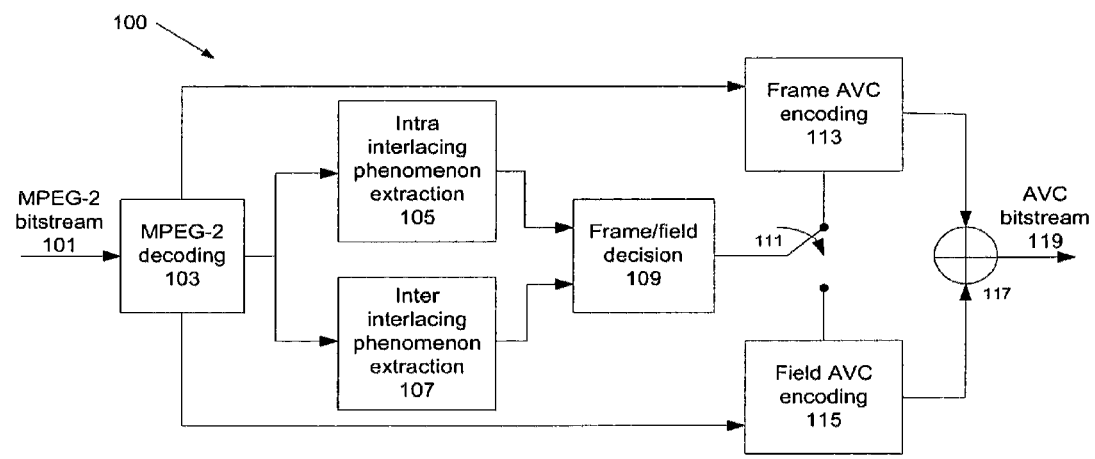
FIG. 1 is a diagram illustrating a overview of the operation of an embodiment of an adaptive picture mode selection transcoder according to the invention.
Figure 2:
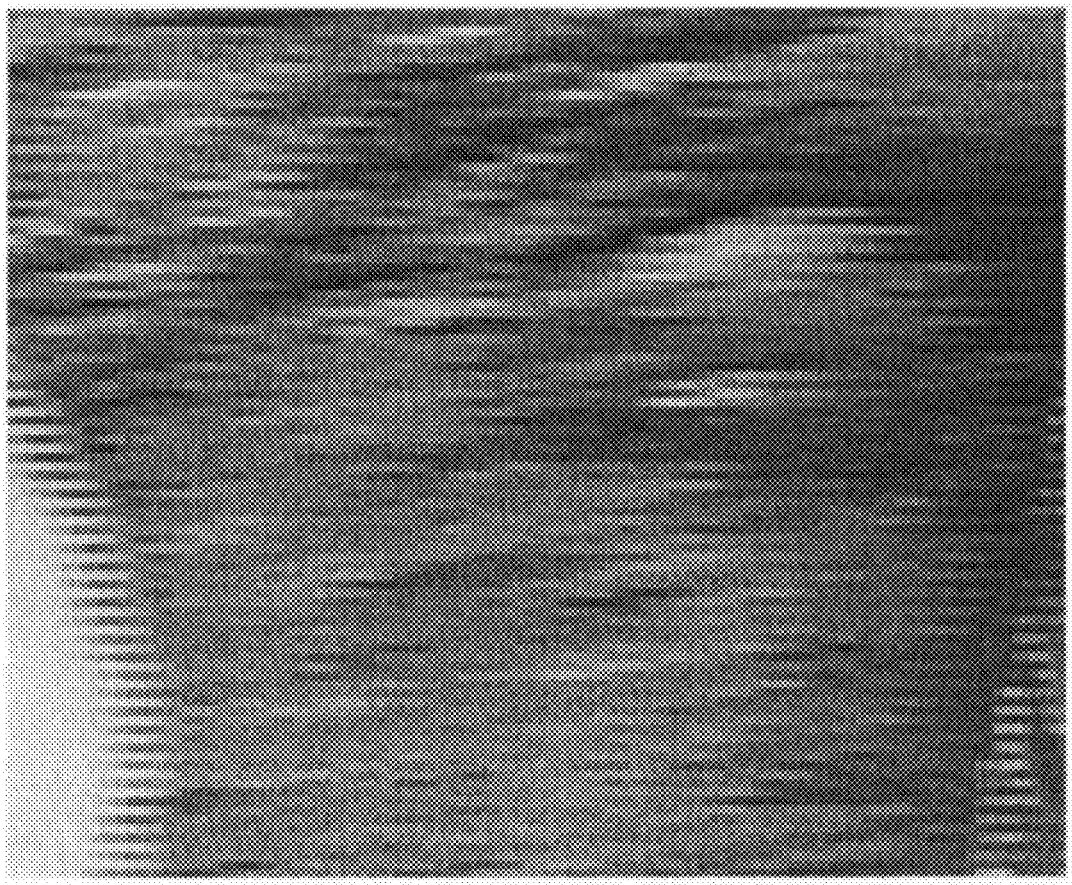
FIG. 2 illustrates interlacing phenomenon in an interlaced frame.

Beginning with an overview of the operation of the invention, FIG. 1 illustrates one embodiment of an adaptive picture mode selection transcoder 100 that determines the appropriate picture mode for an interlaced video sequence based on the magnitude of interlace phenomenon exhibited by the frame. As well known, each frame (also referred to as a picture) in an interlaced video sequence is divided into two fields, one containing the odd-numbered rows and the other containing the even-numbered rows. Because the two fields are sampled at a different time point, a feather-like interlace phenomenon appears on any moving objects, as shown in FIG. 2. Because the block boundaries are replaced with mixed lines, none of the edges are clear. An MPEG-2 encoder applies a discrete cosine transform (DCT) to pixels in the video to transform the values from the spatial to the frequency domain. However, directly applying DCT to such mixed lines generates many big high frequency coefficients, which significantly reduces the compression efficiency of the DCT process. It has been observed that field picture coding is more efficient than frame picture coding when dealing with a frame exhibiting strong interlace phenomenon. On the other hand, for a frame with negligible interlace phenomenon, frame picture coding is more efficient than field picture coding. Therefore, the transcoder 100 adapts its picture mode selection based on the magnitude of interlace phenomenon in the frame being encoded.

Figure 3:
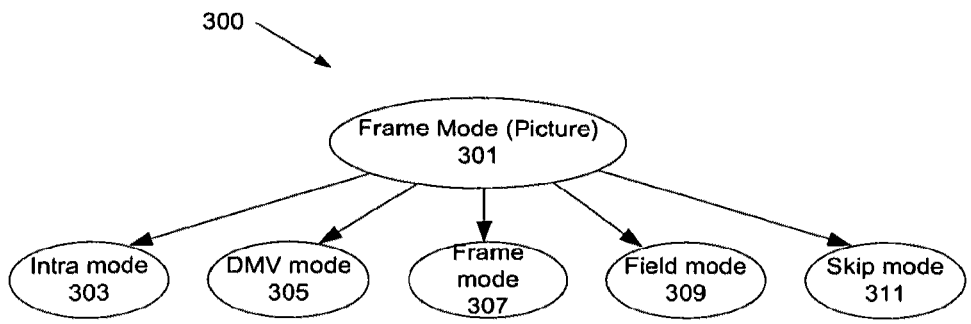
FIG. 3 is a diagram illustrating MPEG-2 frame mode encoding.
Figure 4:
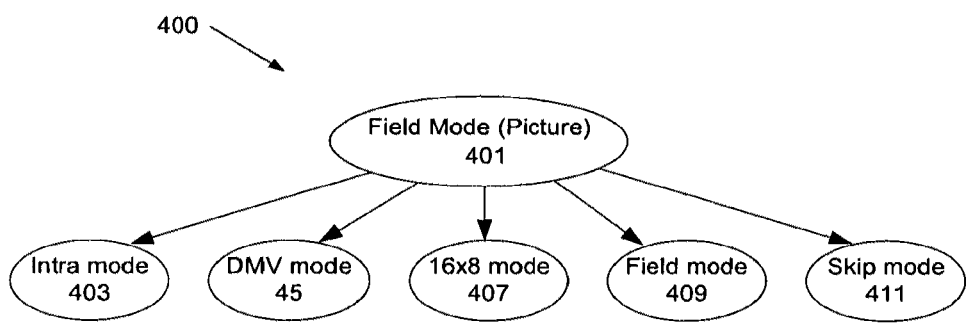
FIG. 4 is a diagram illustrating MPEG-2 field mode encoding.

Frames are divided into 16×16 macroblocks for encoding by an MPEG-2 encoder. The MPEG-2 encoder can select frame mode or field mode encoding at the picture level for each frame. Depending on the picture level encoding, different encoding modes are available for the macroblocks. As illustrated in FIG. 3, when a frame is being encoded using frame (picture) mode encoding 301, its macroblocks have five possible coding modes: intra mode 303, DMV mode 305, frame mode 307, field mode 309 and skip mode 311. When a macroblock is encoded as field mode 309, it is first divided into two 16×8 field blocks, one of which contains eight even rows and the other eight odd rows. It has been observed if a macroblock has strong interlacing phenomenon, most likely the field mode 309 will be selected by the MPEG-2 encoder. In contrast, if any other modes were selected, usually the interlacing phenomenon is minor. FIG. 4 illustrates the macroblock encoding modes available if the MPEG-2 encoder selected field (picture) mode encoding 401 for the frame. The MPEG-2 encoder divides the frame into two fields, each of which is encoded individually. The macroblock encoding modes for field mode 401 are intra mode 403, DMV mode 405, 16×8 mode 407, field mode 409, and skip mode 411. However, field coding of frames is rarely used in the commercial applications and the majority of MPEG-2 bit streams today are encoded as frame mode.

Figure 5:
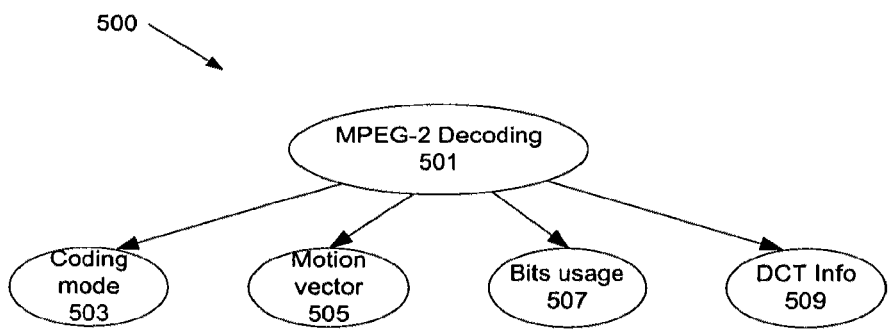
FIG. 5 is a diagram illustrating side information obtained through decoding and MPEG-2 bit stream.

Because the MPEG-2 coding mode generally corresponds to the magnitude of interlace phenomenon, knowing the MPEG-2 coding mode is useful in determining the appropriate AVC coding mode for the transcoder 100. An MEPG-2 decoding module 103 in the transcoder 100 can provide the coding mode along with other picture information when it decodes an input MPEG-2 bit stream 101 into raw data. FIG. 5 illustrates one embodiment of MPEG-2 decoding 501 that provides the coding mode 503, motion vectors 505, bits usage 507 and DCT coefficients 509 for frames in the MPEG-2 bit stream 101.

MPEG-2 frames are either intra (I) frames or inter (P/B) frames. I frames are encoded and decoded independently of any other frame in the bit stream. P and B frames are encoded and decoded relative to other frames, referred to as reference frames. The transcoder 100 obtains the frame type from the MEPG-2 decoding module 103 and passes the DCT coefficients and picture information into either an intra interlacing phenomenon extraction module 105 or an inter interlacing phenomenon extraction module 107 depending on the frame type. In one embodiment, the intra interlacing phenomenon extraction module 105 uses DCT coefficients 509 to detect the interlace phenomenon in an I frame, while the inter interlacing phenomenon extraction module 107 uses motion vector 505 and coding mode 503 information to detect interlace phenomenon in B and P frames, as described in more detail below. Coding mode decision module 109 selects 111 the coding mode for the current frame based on the magnitude of interlace phenomenon found by extraction module 105, 107. If frame picture mode is selected, the frame is encoded by AVC frame coding 113. If field picture mode is selected, the current frame is divided into two fields and AVC field coding 115 is applied to the two fields individually. The encoded frames are merged 117 to form output AVC bit stream 119.

In one embodiment, the interlace phenomenon extraction modules 105, 107 use an interlacing counter to indicate the strength of the interlace phenomenon. The interlacing counter is input into frame/field decision module 109. If the current frame is I frame, the decision module divides the value of the interlacing counter by the number of macroblocks in one frame and compares the result to a threshold value to determine whether frame or field coding should be used according to formula 1. Denoting the value of the interlacing counter as $Interlacing_{Intra}$, the number of macroblocks in one frame as $MB_{Total}$, and the threshold as $T_{field}$, if $$\frac{Interlacing_{Intra}}{MB_{Total}} \geq T_{field}, \quad (1)$$

field picture mode will be selected, and the current frame will be divided into two fields. The first field will be encoded as an I picture and the second field will be encoded as a P picture. If $$\frac{Interlacing_{Intra}}{MB_{Total}} < T_{field}, \quad (2)$$

the frame picture mode will be selected, and the current frame will be encoded as an I frame. Note that $T_{field}$ has a value in the range of 0.2 to 1. After the encoding of an I frame, its interlacing counter value $Interlacing_{Intra}$ is saved for use with the following P/B frames.

If the current frame is P or B frame, the value of the interlacing counter is denoted as $Interlacing_{Intra}$. If $$W_{Intra} \cdot Interlacing_{Intra} + W_{Inter} \cdot Interlacing_{Intra} \geq MB_{Total}, \quad (3)$$

field picture mode will be selected, the current frame will be divided into two fields, and field coding will be used for each field. If $$W_{Intra} \cdot Interlacing_{Intra} + W_{Inter} \cdot Interlacing_{Intra} < MB_{Total}, \quad (4)$$

frame picture mode will be selected and the current frame will be encoded as a P or B frame. Note that $W_{Intra}$ denotes a weight parameter assigned to the intra interlacing phenomenon and $W_{Inter}$ denotes a weight parameter assigned to the current inter interlacing phenomenon, where the weight parameters satisfy the following condition:

$$W_{Intra} + W_{Inter} \leq 2. \quad (5)$$

In one embodiment, $T_{field}$ is 0.4, $W_{intra}$ is 1.0 and $W_{inter}$ is 1.0.

To achieve good motion estimation result, a field coded picture needs to search at least two reference fields to obtain a final motion vector. Since a frame coded picture needs to search only one reference picture, the complexity of frame coding is much lower than field coding. Therefore, if many frames are selected to be coded as frame picture mode, not only the encoding quality is improved, the encoding complexity is also reduced when using the transcoder 100.

Figure 6:
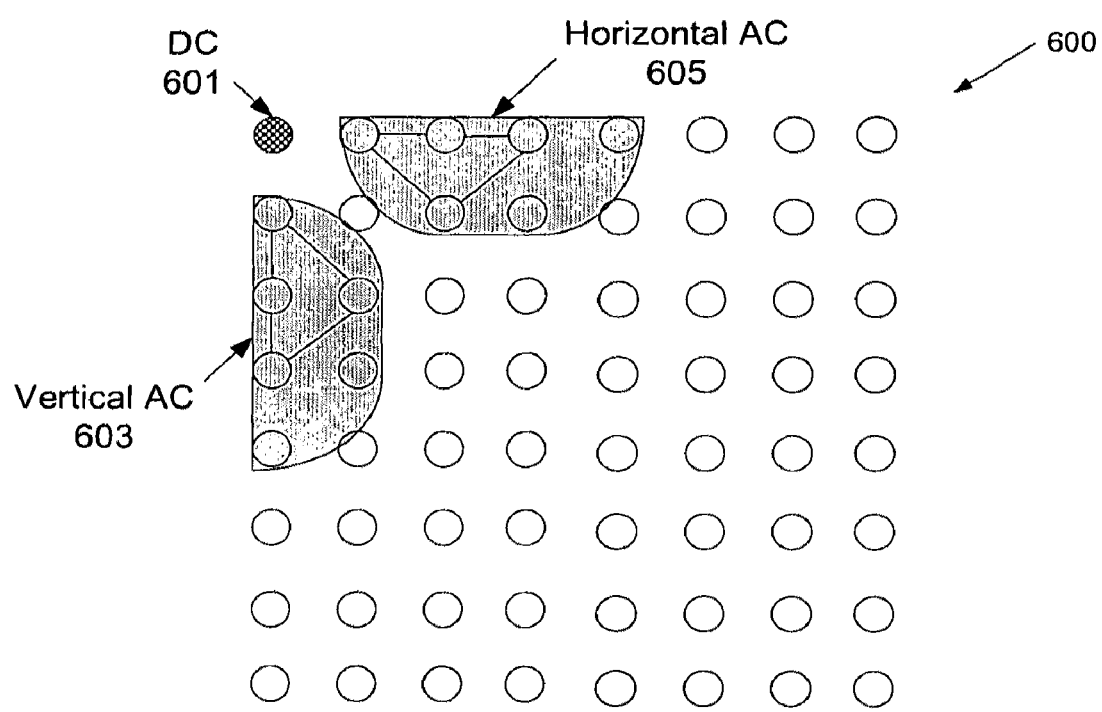
FIG. 6 is a diagram of discrete cosine coefficients in a block of an MPEG-2 encoded frame.

Returning now to FIG. 2, it is apparent that the natural vertical smoothness of the frame has been significantly changed. Referring to FIG. 6, if DCT is applied to an image having a smooth distribution, most of the energy is concentrated in the DC coefficient 601 in the DCT coefficient block 600. The energy of other (AC) coefficients in the block 600 is relatively small. However, as the result of interlacing phenomenon, the vertical AC energy is significantly increased.

For an image with obvious interlacing phenomenon, the vertical AC energy in the block 600 is usually higher than the horizontal AC energy. Hence, interlacing phenomenon can be detected by measuring and comparing the vertical and horizontal AC coefficients energy. Due to the energy concentration effects of DCT, most of the energy is concentrated in the coefficients in the lower frequency coefficients. It has been determined that the first six vertical AC coefficients 603 and the first six horizontal AC coefficients 605 typically represent the AC energy distribution very well. In addition, it has been determined that macroblocks in an MPEG-2 I frame can be predicted using only the DC coefficient. The original high frequency information is not changed by the prediction.

Figure 7A:
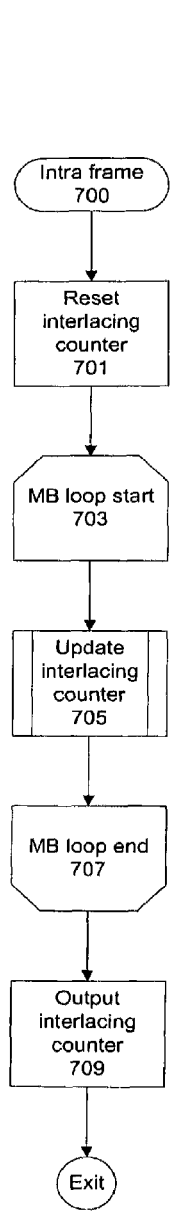
FIGS. 7A and 7B are flow diagrams of an Intra frame method to be performed by a processor according to an embodiment of the invention.
Figure 7B:
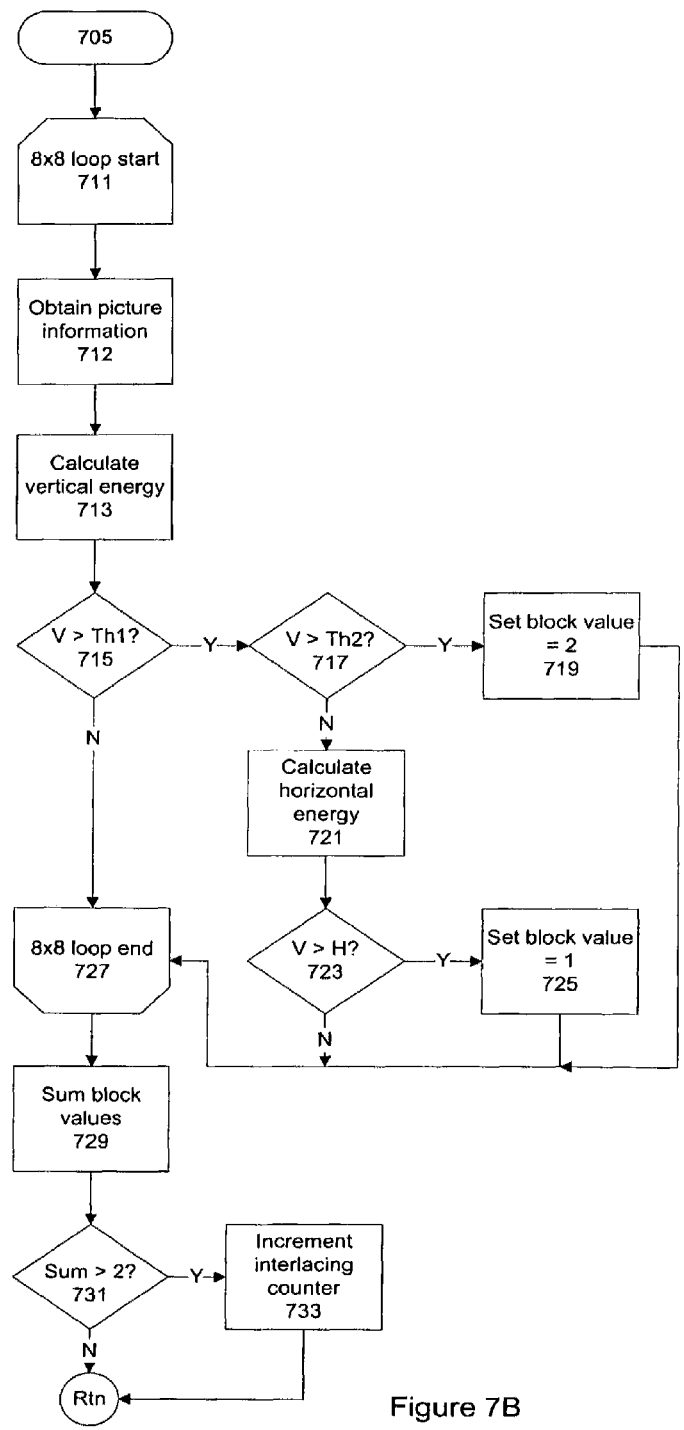
Figure 8:
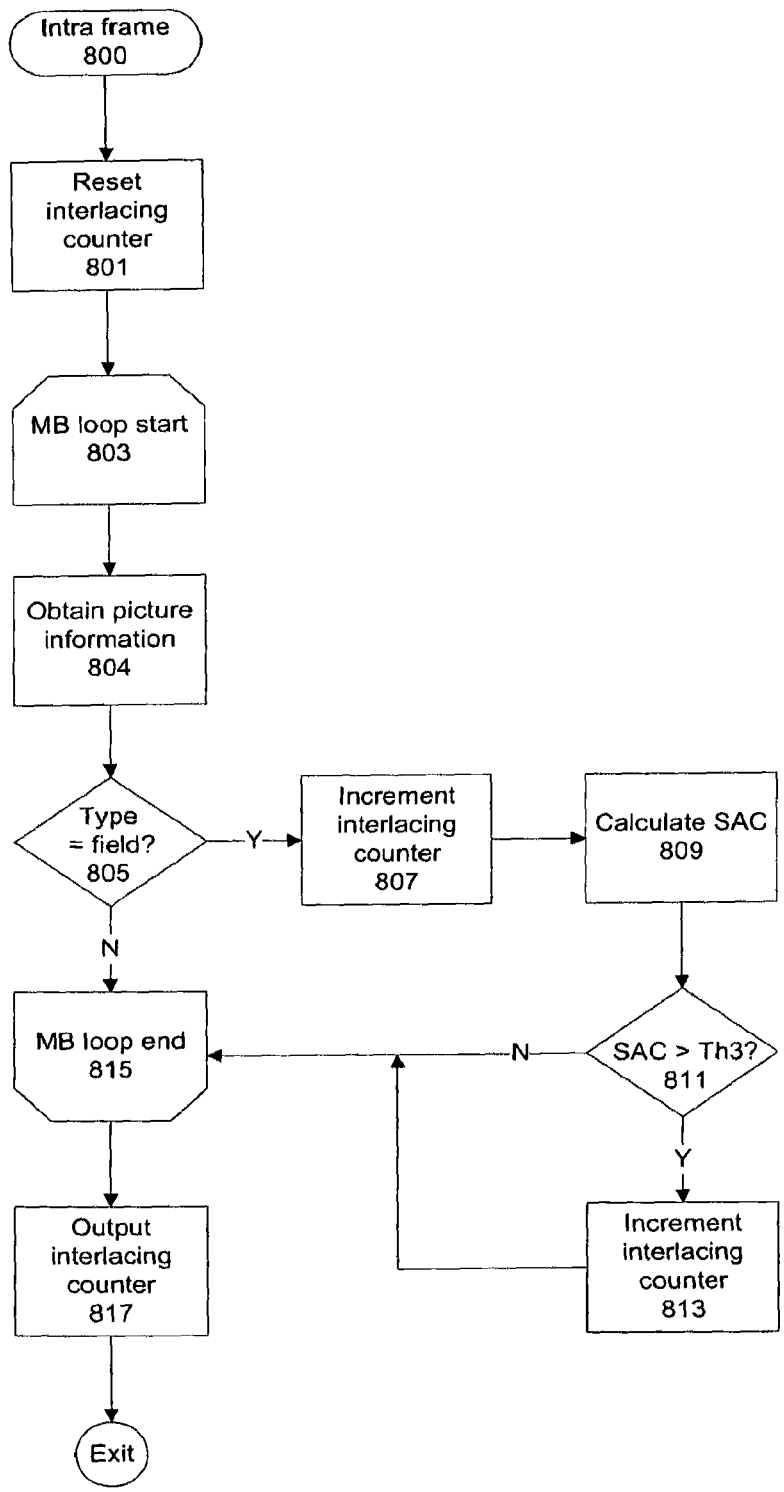
FIG. 8 is a flow diagram of an Intra frame method to be performed by a processor according to an alternate embodiment of the invention.
Figure 9:
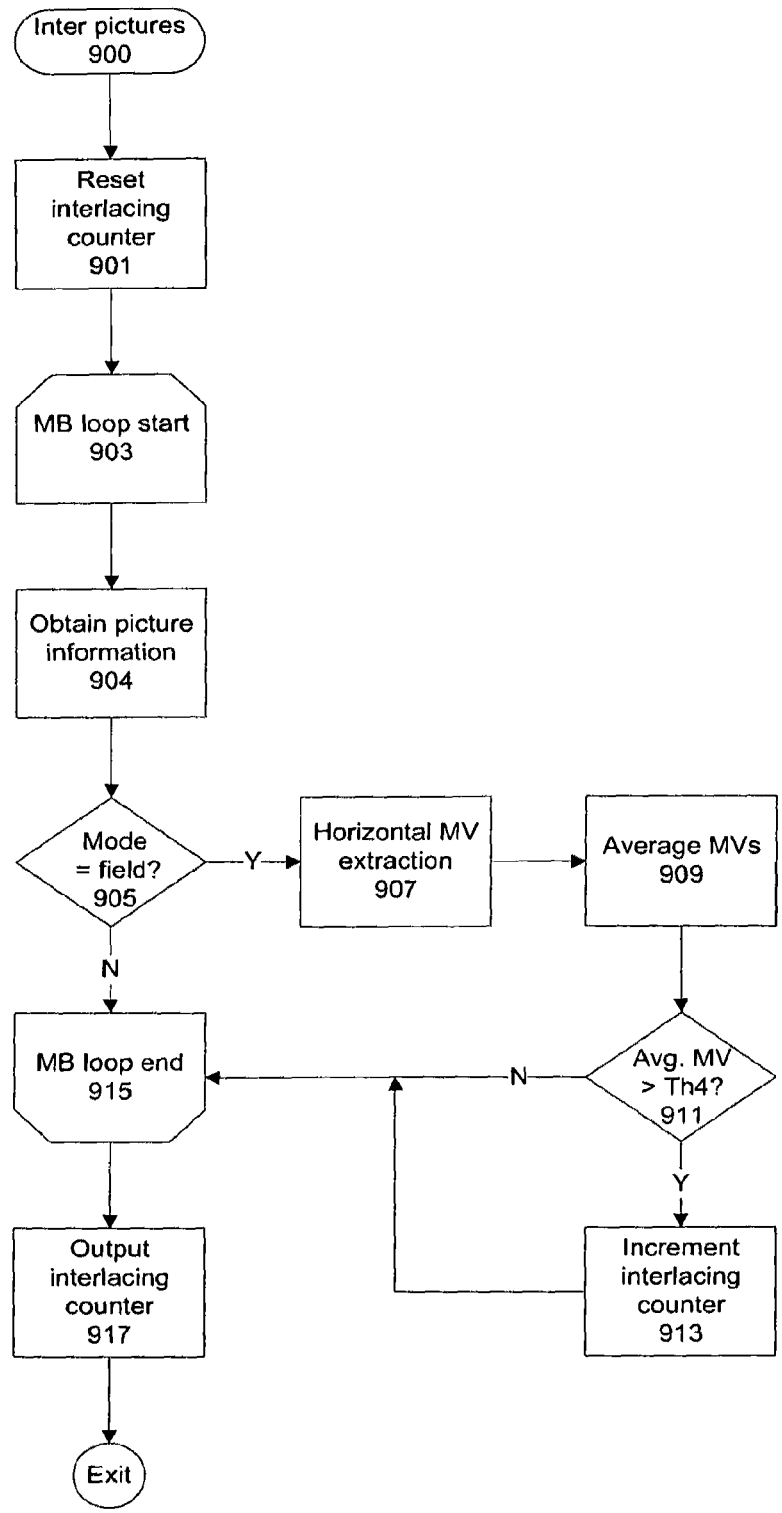
FIG. 9 is a flow diagram of an Inter frame method to be performed by a processor according to an embodiment of the invention.

FIGS. 7A-B and 8 are flow diagrams for methods executed by embodiments of the intra interlacing phenomenon extraction module 105. FIG. 9 is a diagram for a method executed by an embodiment of the inter interlacing phenomenon extraction module 107. All of these methods use an interlacing counter as the measure of the interlacing phenomenon level in a frame, as described above.

An intra frame method illustrated in FIG. 7A resets the interlacing counter to zero when invoked to evaluate a frame. Each macroblock (MB) in the frame is processed by MB loop (block 703 until block 707) to update the interlacing counter to reflect the interlacing phenomenon in the macroblock (block 705). When all macroblocks in the frame have been processed, the interlacing counter is output at block 709 to the frame/field decision module 109.

The updating of the interlacing counter is shown in FIG. 7B. In this embodiment, each macroblock in the frame has been encoded by the MEPG-2 encoder into 8×8 block of DCT coefficients. Each 8×8 block in the current macroblock is processed separately (block 711 through block 727). The DCT coefficients of the current 8×8 block are obtained from the MPEG-2 decoding module 103 after de-quantization (block 712). The vertical AC energy of the 8×8 block is calculated by summing the absolute values of the first 6 vertical AC coefficients 603 (block 713). The calculated vertical energy (V) is compared to threshold 1 (Th1) at block 715. If the calculated vertical energy is less or equal to threshold 1, the interlacing phenomenon in the current 8×8 block is minor, and the method proceeds to the next 8×8 block, if any. Otherwise, the calculated vertical energy is compared to threshold 2 (Th2) at block 717. If the calculated vertical energy is greater than threshold 2, the interlacing phenomenon in the current 8×8 block is very strong and the current block value is set to two (block 719). If the calculated vertical energy is less or equal to threshold 2, the horizontal AC energy of the 8×8 block is calculated by summing the absolute values of the first 6 horizontal AC coefficients 605 (block 721). The calculated vertical energy V is compared to the calculated horizontal energy H at block 723. If the calculated vertical energy is less than the calculated horizontal energy, the interlacing phenomenon in the current 8×8 block is minor and the method proceeds to the next 8×8 block. Otherwise, the current block value is set to 1 (block 725). When all 8×8 blocks in the current macroblock have been processed, the block values are summed (block 729). If the sum is greater than two (block 731), the interlacing counter is incremented by one. It will be appreciated that only two 8×8 blocks may need to processed if they both exhibit a magnitude of interlacing phenomenon that causes them each to be assigned a block value of one. One of skill will immediately understand how to modify the embodiment illustrated in FIG. 7B to test for this case and such modifications are considered within the scope of the invention. In one embodiment the values for Th1 and Th2 are 100 and 400, respectively.

As discussed above, if a macroblock has strong interlacing phenomenon, most likely field mode will be selected by the MPEG-2 encoder, and if any other modes were selected, usually the interlacing phenomenon is minor. In addition, it has been observed that an interlaced picture having a heavy texture tends to have better encoding results when encoded in field picture mode. The alternate embodiment of intra frame interlace phenomenon detection shown in FIG. 8 uses the MPEG-2 encoding mode.

As in FIG. 8, the method 800 resets the interlacing counter to zero (block 801) when invoked to evaluate a frame. Each macroblock in the frame is processed by MB loop (block 803 until block 815) to update the interlacing counter to reflect the interlacing phenomenon in the macroblock. When all macroblocks in the frame have been processed, the interlacing counter is output at block 817 to the frame/field decision module 109. The DCT encoding type and the DCT coefficients of each 8×8 block in the current macroblock are obtained from the MPEG-2 decoding module 103 after de-quantization (block 804). The DCT coding type can be field or frame. For DCT field type, after an intra or frame mode macroblock is divided into two 16×8 field blocks, 8×8 DCT is applied to the field block separately. Otherwise, the DCT type is frame. If the DCT encoding type is frame (block 805), the interlacing phenomenon in the current 8×8 block is minor, and the method proceeds to the next 8×8 block, if any. If the DCT encoding type is field, the interlacing phenomenon in the current 8×8 block is strong, so the interlacing counter is incremented by one at block 807. The current macroblock prediction residue is calculated by summing the absolute value of the DCT coefficients (SAC) at block 809. The SAC is compared with a threshold 3 (Th3) at block 811. If SAC is greater than the threshold 3, the interlacing counter is incremented by one again at block 813. Thus, the counter is incremented by two for a heavy textured and field coded macroblock. In one embodiment, the value of threshold 3 is 3000.

In still another embodiment, the intra interlacing phenomenon extraction module 105 executes both intra frame methods 700 and 800, sums the two interlacing counters produced by the methods, and divides the result by two, to produce a final interlacing counter.

For an I frame, the DC prediction does not change the AC distribution so the information of the original picture is kept. However, for P and B frames, the DCT is applied on the motion compensated pixel residues so most of the information of the original picture is lost. Hence, vertical and horizontal energies used to detect the interlacing phenomenon for 1 frame cannot be directly used for P and B frames. However, it has been observed that the MPEG-2 encoder's decision to code a field or frame picture is directly related to the motion activities of each sequence, or more specifically, each frame. The sequences or parts of sequence with high motion activities favor field coding. The sequences or parts of sequence with low motion activities favor frame coding. Since MPEG-2 decoding module 103 can provide the MPEG-2 motion vector information, this information can be used for interlacing phenomenon detection. Also, as described previously, the macroblock coding mode correlates to the magnitude of interlacing phenomenon exhibited by the macroblock.

The Inter frame method 900 shown in FIG. 9 detects interlacing phenomenon using the motion value information and coding mode. As in FIGS. 7A and 8, the method 900 resets the interlacing counter to zero (block 901) when invoked to evaluate a frame. Each macroblock in the frame is processed by MB loop (block 903 until block 917) to update the interlacing counter to reflect the interlacing phenomenon in the macroblock. When all macroblocks in the frame have been processed, the interlacing counter is output at block 917 to the frame/field decision module 109. The encoding mode of the current macroblock are obtained from the MPEG-2 decoding module 103 after de-quantization (block 904). If the current macroblock is not encoded in field mode (block 905), the method proceeds to the next macroblock, if any. If the current macroblock is encoded in field mode, two horizontal motion vectors (MV) of the current macroblock is extracted, one for the top 16×8 field block and one for the bottom 16×8 field block (block 907). The average of the absolute value of these two motion vectors is calculated at block 909. The average is compared with a threshold 4 (Th4) at block 911. If the average is greater than threshold 4, the interlacing phenomenon in the current macroblock is strong and the interlacing counter is incremented by one (block 913). In one embodiment, Th4 is 4.

The particular methods of the invention have been described in terms of computer software with reference to a series of flow diagrams. The methods constitute computer programs made up of machine-executable instructions illustrated as blocks (acts) in FIGS. 7A-B, 8 and 9. Describing the methods by reference to a flow diagram enables one skilled in the art to develop such programs including such instructions to carry out the methods on suitably configured machines (the processor of the machine executing the instructions from machine-readable media, including memory). The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 7A-B, 8 and 9 without departing from the scope of the invention and that no particular order is implied by the arrangement of blocks shown and described herein.

Figure 10A:
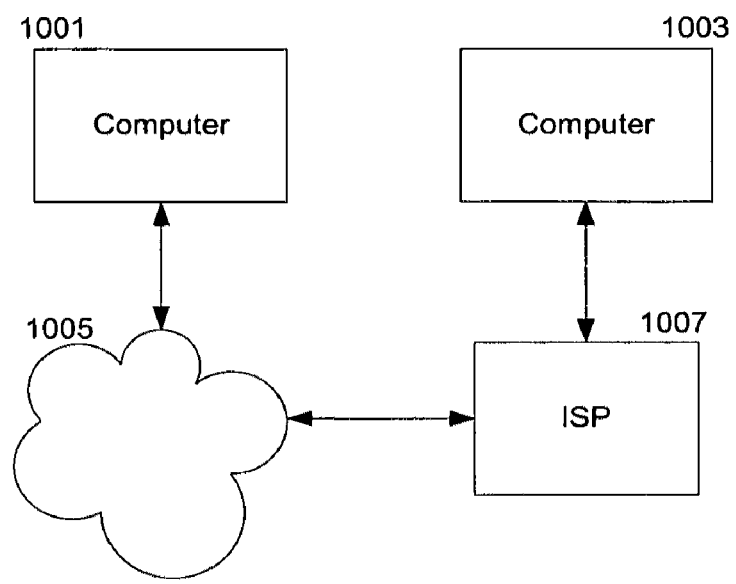
FIGS. 10A and 10B are diagrams of a computer environment suitable for practicing the invention.

In one embodiment, as shown in FIG. 10A, a server computer 1001 is coupled to, and provides data through, the Internet 1005. A client computer 1003 is coupled to the Internet 1005 through an ISP (Internet Service Provider) 1005 and executes a conventional Internet browsing application to exchange data with the server 1001. For example, the server computer 1001 may contain the transcoding modules or execute the method described above to transcode MPEG-2 video sequence into AVC before transmitting the video sequences to the client computer 1003 for viewing. Optionally, the server 1001 can be part of an ISP which provides access to the Internet for client systems. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet allows users of client computer systems to exchange information, receive and send e-mails, view documents, such as documents which have been prepared in the HTML format, and receive content. It is readily apparent that the present invention is not limited to Internet access and Internet web-based sites; directly coupled and private networks are also contemplated.

Figure 10B:
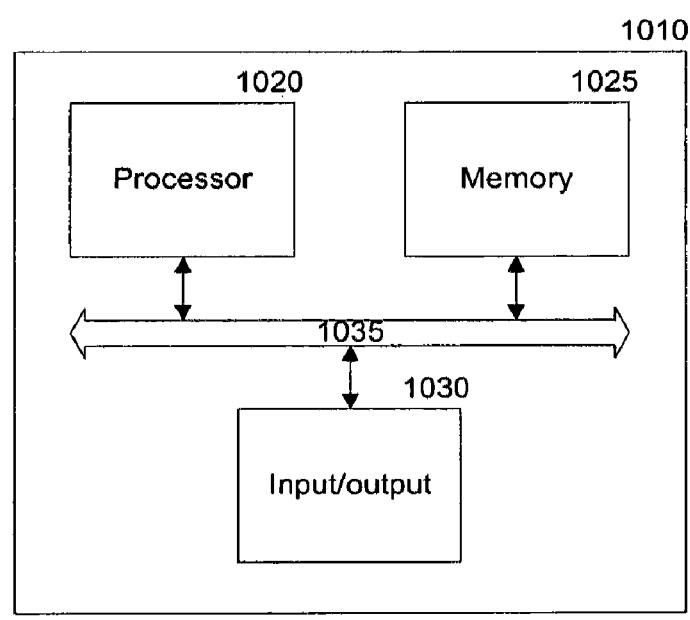

One embodiment of a computer system suitable for use as server 1001 is illustrated in FIG. 10B. The computer system 1010, includes a processor 1020, memory 1025 and input/output capability 1030 coupled to a system bus 1035. The memory 1025 is configured to store instructions which, when executed by the processor 1020, perform the methods described herein. The memory 1025 may also store data for the video sequences before, after and during transcoding. Input/output 1030 provides for the delivery and display of the data, or portions or representations thereof, and also the input of data of various types for storage, processing or display. Input/output 1030 also encompasses various types of computer-readable media, including any type of storage device that is accessible by the processor 1020. One of skill in the art will immediately recognize that the server 1001 is controlled by operating system software executing in memory 1025. Input/output 1030 and related media store the machine-executable instructions for the operating system and methods of the present invention as well as the data for the video sequences.

The description of FIGS. 10A-B is intended to provide an overview of computer hardware and other operating components suitable for implementing the invention, but is not intended to limit the applicable environments. It will be appreciated that the computer system z40 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

An adaptive picture mode selection transcoder has been described that improves the encoding quality of video sequences and reduces the encoding complexity when many MPEG-2 video frames are selected to be coded in AVC frame picture mode. In addition, because the transcoding process adds only negligible computation to existing transcoders, the quality improvement and complexity reduction comes at a relatively low cost.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the transcoder modules and methods have been described with reference to MPEG-2 and AVC video sequences, but that the invention is not limited to only those video formats. Furthermore, those of ordinary skill within the art will appreciate the transcoder modules may be arranged differently than described herein and the transcoder methods may be distributed among different processors to achieve the same results. Moreover, although the transcoder has been described in terms of modules, it will be readily apparent that the modules can be implemented as hardware components or firmware logic as well as one or more processors executing the methods described herein. In addition, the values given for variables are the result of empirical analysis and are not intended to limit the practice of the transcoder to use with only those values. Therefore, it is manifestly intended that this invention be limited only by the following claims and equivalents thereof.

What is claimed is:

1. A method of execution by a processor comprising:
   determining a magnitude of interlacing phenomenon in a frame of video using picture information obtained during decoding of the video from a first format, the frame divided into macroblocks and an interlacing counter indicating the magnitude of the interlacing phenomenon, wherein if the picture information comprises motion vector information for a macroblock, the determining comprises:
   calculating an average of motion vector values; and
   comparing the average to a threshold amount; and
   selecting an encoding mode in a second format in accordance with the magnitude for subsequently encoding the video in the second format by comparing the interlacing counter to a threshold amount.

2. The method of claim 1, wherein the picture information comprises discrete cosine transform coefficients for a macroblock and the determining comprises:
   comparing values of the coefficients with threshold amounts.

3. The method of claim 1, wherein the picture information comprises first format encoding mode information for a macroblock and the determining comprises:
   assigning a magnitude based on the first format encoding mode information.

4. The method of claim 3, wherein the picture information further comprises discrete cosine transform coefficients for the macroblock and the determining further comprises:
   calculating a sum of values for the coefficients; and
   comparing the sum to a threshold amount.

5. The method of claim 1, wherein the picture information comprises a first format encoding mode for the frame and the determining is specific to the first format encoding mode.

6. A non-transitory machine-readable storage medium having embedded thereon instructions for execution by a processor, the instructions comprising:
   determining a magnitude of interlacing phenomenon in a frame of video using picture information obtained during decoding of the video from a first format, the frame divided into macroblocks and an interlacing counter indicating the magnitude of the interlacing phenomenon, wherein if the picture information comprises motion vector information for a macroblock, the determining comprises:
   calculating an average of motion vector values; and
   comparing the average to a threshold amount; and
   selecting an encoding mode in a second format in accordance with the magnitude for subsequently encoding the video in the second format by comparing the interlacing counter to a threshold amount.

7. The non-transitory machine-readable storage medium of claim 6, wherein the picture information comprises discrete cosine transform coefficients for a macroblock and the determining instructions comprise:
   comparing values of the coefficients with threshold amounts.

8. The non-transitory machine-readable storage medium of claim 6, wherein the picture information comprises first format encoding mode information for a macroblock and the determining instructions comprise:
   assigning a magnitude based on the first format encoding mode information.

9. The non-transitory machine-readable storage medium of claim 8, wherein the picture information further comprises discrete cosine transform coefficients for the macroblock and the determining instructions further comprise:
   calculating a sum of values for the coefficients; and
   comparing the sum to a threshold amount.

10. non-transitory The machine-readable storage medium of claim 6, wherein the picture information comprises a first format encoding mode for the frame and the determining instructions executed are specific to the first format encoding mode for the frame.

11. A computer system comprising:
    a processor coupled to a memory through a bus; and
    instructions executed from the memory by the processor to cause the processor
       to determine a magnitude of interlacing, phenomenon in a frame of video using picture information obtained during decoding of the video from a first format, the frame divided into macroblocks and an interlacing counter indicating the magnitude of the interlacing phenomenon, wherein if the picture information comprises motion vector information for a macroblock, the instructions further cause the processor, when determining the magnitude, to calculate an average of motion vector values, and to compare the average to a threshold amount, and
       to select an encoding mode in a second format in accordance with the magnitude for subsequently encoding the video in the second format by comparing the interlacing counter to a threshold amount.

12. The computer system of claim 11, wherein the picture information comprises discrete cosine transform coefficients for a macroblock and the instructions further cause the processor, when determining the magnitude, to compare values of the coefficients with threshold amounts.

13. The computer system of claim 11, wherein the picture information comprises first format encoding mode information for a macroblock and the instructions further cause the processor, when determining the magnitude, to assign a magnitude based on the first format encoding mode information.

14. The computer system of claim 11, wherein the picture information comprises a first format encoding mode for the frame and the instructions that cause the processor to determine the magnitude are specific to the first format encoding mode.

15. An apparatus comprising:
    means for determining a magnitude of interlacing phenomenon in a frame of video using picture information obtained during decoding of the video from a first format, the frame divided into macroblocks and an interlacing counter indicates the magnitude of the interlacing phenomenon, wherein if the picture information comprises motion vector information for a macroblock, the means for determining calculates an average of motion vector values and compares the average to a threshold amount; and
    means for selecting an encoding mode in a second format in accordance with the magnitude for subsequently encoding the video in the second format by comparing the interlacing counter to a threshold amount.

16. The apparatus of claim 15, wherein the means for determining comprises:
    means for extracting intra interlacing phenomenon; and
    means for extracting inter interlacing phenomenon.

* * * * *